United States Patent [19]

Blackburn et al.

[11] 3,856,704

[45] Dec. 24, 1974

[54] PROCESS FOR PREPARING DESACETOXYCEPHALOSPORANIC ACIDS FROM CEPHALOSPORANIC ACIDS AND PALLADIUM OXIDE HYDRATE SUPPORTED ON ALPHA-CELLULOSE USEFUL IN THE PROCESS

[75] Inventors: Dale W. Blackburn, Moorestown, N.J.; Robert F. Devenney, Newtown Square, Pa.; John J. Mlynarski, Oaklyn, N.J.

[73] Assignee: Smithkline Corporation, Philadelphia, Pa.

[22] Filed: Aug. 7, 1973

[21] Appl. No.: 386,461

Related U.S. Application Data

[62] Division of Ser. No. 117,691, Feb. 22, 1971, Pat. No. 3,773,761.

[52] U.S. Cl.................. 252/430, 252/427, 252/472
[51] Int. Cl...................................................... B01j
[58] Field of Search................. 252/427, 430, 472

[56] References Cited
UNITED STATES PATENTS

| | | | |
|---|---|---|---|
| 1,222,608 | 4/1917 | Dewar et al. | 252/430 X |
| 3,644,486 | 2/1972 | Balt et al. | 252/472 |

OTHER PUBLICATIONS

Emmett "Catalysis," Vol. 1 (1954) page 31.
Wittam "Modern Pulp & Paper Making," (1942) page 22.

*Primary Examiner*—W. Cannon
*Attorney, Agent, or Firm*—Joan S. Keps; Richard D. Foggio; William H. Edgerton

[57] ABSTRACT

A process for the preparation of desacetoxycephalosporanic acids with palladium oxide hydrate optionally supported on an inert carrier and palladium oxide hydrate supported on alpha-cellulose which is useful in the process.

1 Claim, No Drawings

PROCESS FOR PREPARING DESACETOXYCEPHALOSPORANIC ACIDS FROM CEPHALOSPORANIC ACIDS AND PALLADIUM OXIDE HYDRATE SUPPORTED ON ALPHA-CELLULOSE USEFUL IN THE PROCESS

This is a division of application Ser. No. 117,691 filed Feb. 22, 1971 now U.S. Pat. No. 3,773,761.

This invention relates to an improved process for the preparation of desacetoxycephalosporanic acids which comprises hydrogenating cephalosporanic acids with palladium oxide hydrate optionally supported on an inert carrier. Palladium oxide hydrate may be used in the process of this invention either unsupported or supported on an inert carrier such as cellulose, carbon, calcium carbonate or alumina.

In the process of this invention it is particularly advantageous to use palladium oxide hydrate supported on alpha-cellulose having a particle size of about 20 to 60 microns in average length and about 16 to 20 microns in average thickness. This material is also an object of this invention.

The process of converting cephalosporanic acids to desacetoxycephalosporanic acids by hydrogenation is known to the art. According to the method of Stedman, U.S. Pat. No. 3,124,576, hydrogenation is carried out using palladium-on-an-inert carrier such as palladium-on-carbon or palladium-on-barium sulfate.

The method of the present invention using palladium oxide hydrate optionally supported on an inert carrier is advantageous because consistent high yields of the desacetoxycephalosporanic acids are obtained.

The process of this invention may be represented as follows:

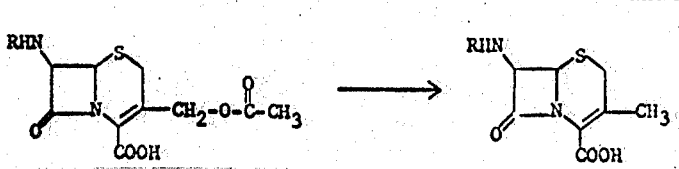

in which R is hydrogen or acyl.

The compound prepared by the process of this invention in which R is hydrogen is 7-aminodesacetoxycephalosporanic acid (7-ADCA which is useful as an intermediate for the preparation of compounds having antibiotic activity. For example, cephalexin, which is 7-(D-α-aminophenylacetamido)desacetoxycephalosporanic acid, may be prepared by acylating 7-ADCA. Alternatively, 7-acylaminodesacetoxycephalosporanic acids having antibiotic activity, for example 7-(D-α-aminophenylacetamido)desacetoxycephalosporanic acid (cephalexin), may be prepared by the process of this invention by hydrogenating the corresponding 7-acylaminocephalosporanic acids, for example 7-(D-α-aminophenylacetamido)cephalosporanic acid.

In the hydrogenation process according to this invention, the cephalosporanic acid and the palladium oxide hydrate optionally substituted on an inert carrier are present in a molar ratio of about 5.5:1 to 1:1. The process is carried out in an inert solvent, preferably water. Preferably, about 3 to 8 equivalents of base, such as ammonium carbonate, are present. The reaction mixture is preferably buffered at pH of about 7 to 9.5. A basic buffer such as sodium bicarbonate, sodium borate, ammonium chloride-ammonium hydroxide, ammonium bicarbonate or, preferably, ammonium carbonate is used. The hydrogenation is preferably carried out at about −5°C. to 15°C.

The palladium oxide hydrate used in the process of this invention is prepared by treating palladium chloride suspended in water with a base, for example a hydroxide such as sodium hydroxide, potassium hydroxide or lithium hydroxide or a carbonate such as ammonium carbonate or an alkali metal carbonate. To prepare the palladium oxide hydrate supported on an inert carrier, such as cellulose, carbon, calcium carbonate or alumina, the carrier is added to a suspension of palladium chloride in water and then alkali is added.

The following examples are not limiting but are illustrative of this invention.

EXAMPLE 1

Palladium chloride (62 g.) is suspended in 1.2 l. of deionized water and the suspension is heated to 80°C. with vigorous agitation. The aqueous suspension turns dark red. After 5 minutes, a solution of 40 g. of sodium hydroxide in 160 ml. of water is slowly added. The resultant brown suspension thickens slightly. The heating is discontinued and the suspension is agitated until it is at room temperature (3–4 hours). The solid material is filtered off. When the filter cake is nearly dry, it is washed with 0.5 l. of water and 2 l. of 1% acetic acid, then air-dried overnight and then ground to give palladium oxide hydrate.

EXAMPLE 2

An autoclave is chilled to 4°C. and charged with 300 g. of ammonium carbonate, 272 g. of 7-aminocephalosporanic acid, 2.4 l. of an equal mixture of tap water and ice and 29 g. of palladium oxide hydrate (prepared as in Example 1). The reaction is sealed and agitated for 15 minutes at 1°C., then flushed with hydrogen and then pressurized with 50 p.s.i. of hydrogen. The reaction is agitated and the hydrogenolysis is allowed to proceed for 1.5 hours.

The reaction mixture is acidified with 1.65 kg. of 50% (w/w) cold sulfuric acid with cooling by adding ice to keep the temperature less than 10°C. Using suitable venting, 225 ml. of 22% ammonium sulfide is added. Charcoal is added and the suspension is filtered. The filter cake is washed with one liter of 2N sulfuric acid. The filtrate is chilled to 5°C. and ammonium hydroxide is added slowly with agitation to bring the pH to 3.6. The suspension is cooled to 5°C. and allowed to stand for 1 hour. The crystalline product is filtered off and washed with 100 ml. of deionized water and two 100 ml. portions of acetone to give 7-aminodesacetoxycephalosporanic acid, yield 78–79%.

EXAMPLE 3

A suspension of palladium chloride (135.5 g.) in one gallon of deionized water is heated with agitation to 80°C. and maintained at this temperature for about 30 minutes. Alpha-cellulose ('Solka-floc' BW–100) having a particle size of about 55 microns in average length and about 19 microns in average thickness (325 g.) is added and the suspension is agitated until the cellulose is wet. Then 166 ml. of 10N sodium hydroxide is added within 10 minutes and the heating is discontinued. The suspension is allowed to cool to 40°C. The solid material is filtered off and washed with one gallon of 1% acetic acid to give palladium oxide hydrate supported on alpha-cellulose having a particle size of about 55 microns in average length and about 19 microns in average thickness (20% palladium by weight).

EXAMPLE 4

An autoclave is chilled to 4°C. and charged with 989 g. of ammonium carbonate, 833 g. of 7-aminocephalosporanic acid, 81.2 g. of palladium oxide hydrate supported on alphacellulose having a particle size of about 55 microns in average length and about 19 microns in average thickness (20% palladium by weight), prepared as in Example 3, and deionized water to bring the total volume to 15.14 liters. The reactor is sealed and agitated for 15 minutes at 1°C., then flushed with hydrogen and pressurized with 50 p.s.i. of hydrogen. The agitation is again initiated and the hydrogenolysis is allowed to proceed for 1.5 hours.

The reaction mixture is acidified with 5.28 kg. of 50% (w/w) cold sulfuric acid with cooling by adding ice to keep the temperature less than 10°C. Using suitable venting, 742.5 ml. of 22% ammonium sulfide is added. Approximately 400 g. of cellulose is added and the suspension is filtered. The filter cake is washed with 3.3 l. of 2N sulfuric acid. The filtrate is chilled to 5°C. and ammonium hydroxide is added with agitation to bring the pH to 3.6. The suspension is cooled to 5°C. and allowed to stand for 1 hour. The crystalline product is cooled and washed with 300 ml. of deionized water and two 300 ml. portions of acetone to give 7-aminodesacetoxycephalosporanic acid, yield 79-86%.

EXAMPLE 5

A suspension of 62 g. of palladium chloride in 1.2 l. of deionized water is heated with agitation at 80°C. for five minutes. Carbon is added and the suspension is agitated until the carbon is wet. Then a solution of 40 g. of sodium hydroxide in 160 ml. of water is slowly added. The heating is discontinued and the agitation is continued for three hours. Filtering and washing the filter cake with 1% acetic acid gives 10% palladium oxide hydrate supported on carbon.

Hydrogenolysis of 7-aminocephalosporanic acid (204 g.) using the above prepared 10% palladium oxide hydrate supported on carbon (220 g.) by the procedure of Example 4 gives 7-aminodesacetoxycephalosporanic acid.

EXAMPLE 6

By the procedure of Example 2, cephalosporin C is hydrogenated using palladium oxide hydrate (prepared as in Example 1) to give 7-(5-aminoadipamido)desacetoxycephalosporanic acid.

EXAMPLE 7

By the procedure of Example 4, 7-(D-$\alpha$-aminophenylacetamido)cephalosporanic acid is hydrogenated using palladium oxide hydrate supported on alpha-cellulose having a particle size of about 55 microns in average length and about 19 microns in average thickness (20% palladium by weight), prepared as in Example 3, to give 7-(D-$\alpha$-aminophenylacetamido)desacetoxycephalosporanic acid.

EXAMPLE 8

By the procedure of Example 4, the following cephalosporanic acids are hydrogenated using palladium oxide hydrate supported on alpha-cellulose (prepared as in Example 3):
  7-mandelamidocephalosporanic acid
  7-phenylacetamidocephalosporanic acid
  7-phenoxyacetamidocephalosporanic acid
  7-(2-thienylacetamido)cephalosporanic acid
to give the following desacetoxycephalosporanic acids, respectively:
  7-mandelamidodesacetoxycephalosporanic acid
  7-phenylacetamidodesacetoxycephalosporanic acid
  7-phenoxyacetamidodesacetoxycephalosporanic acid
  7-(2-thienylacetamido)desacetoxycephalosporanic acid.

What is claimed is:

1. Palladium oxide hydrate supported on alphacellulose having a particle size of about 20 to 60 microns in average length and about 16 to 20 microns in average thickness.

* * * * *